United States Patent

[11] 3,582,982

| [72] | Inventors | Merle R. Swinehart<br>Brookfield;<br>Richard A. Greiner, Madison, both of, Wis. |
|---|---|---|
| [21] | Appl. No. | 853,089 |
| [22] | Filed | Aug. 26, 1969 |
| [45] | Patented | June 1, 1971 |
| [73] | Assignee | Cutler-Hammer Inc.<br>Milwaukee, Wis. |

[54] ELECTRONIC MOTOR OVERLOAD RELAY CONTROL SYSTEM
17 Claims, 2 Drawing Figs.

[52] U.S. Cl. .................................................. 317/22,
317/38, 317/33
[51] Int. Cl. .................................................. H02h 5/00,
H02h 3/08
[50] Field of Search .......................................... 317/36, 38,
22, 27, 33, 31

[56] References Cited
UNITED STATES PATENTS

| 3,300,689 | 1/1967 | Beddoes | 317/31X |
| 3,419,757 | 12/1968 | Steen | 317/36 |
| 3,480,834 | 11/1969 | Billings | 317/36X |

Primary Examiner—William M. Shoop, Jr.
Assistant Examiner—Harvey Fendelman
Attorney—Hugh R. Rather

ABSTRACT: A solid-state differential amplifier system that trips out a relay when an overload condition occurs in a motor power supply circuit. An overload current sensing circuit provides a voltage proportional to the peak value of one or more overload conditions and includes a current avalanche device for protecting the following devices from excessive voltages. This voltage operates a timing circuit to provide a control voltage having an inverse time delay relative to the magnitude of the overload condition sensed. The control voltage upon reaching an ultimate trip value that is adjustable trips a differential amplifier to deenergize the overload relay. A diode-resistor circuit makes the tripping action regenerative once it is started for positive dropout of the overload relay. A constant current circuit supplies operating current to the differential amplifier. A voltage divider provides a voltage that normally biases the differential amplifier on to energize the overload relay and includes a potentiometer for adjusting the ultimate trip current value. The voltage divider supplies an operating voltage for the constant current circuit. An optional instantaneous trip circuit receives a reference voltage from the voltage divider circuit and functions to cause immediate tripping of the differential amplifier when the overload current exceeds a predetermined point above the ultimate trip value. The system provides time delayed automatic or manual reset as alternatives with minor modification.

Inventors
Merle R. Swinehart
Richard A. Greiner
By [signature]
Attorney ial trip-out time for a cold motor running on 150 percent load.

ELECTRONIC MOTOR OVERLOAD RELAY CONTROL SYSTEM

BACKGROUND OF THE INVENTION

Electronic motor overload relay control systems have been known heretofore. Such prior systems have usually employed overload detectors such as current transformers and rectifier combinations to convert AC current values to a direct voltage signal. These prior systems have also used RC circuits to provide a time delay function after the current being monitored has exceeded a certain threshold value. Various level detectors and trigger circuits have been used to trip a relay or a circuit breaker in response to the time delayed voltage signal. These prior systems have also used an instantaneous trip feature that bypasses the timing function if the overload current exceeds a certain preset value.

While these prior systems have been useful for their intended purposes, certain improvements are desirable. The present invention relates to such improvements.

SUMMARY OF THE INVENTION

This invention relates to improvements in electronic overload relay control systems and more particularly to means for making such systems more accurate, reliable and economical and consequently more useful.

An object of the invention is to provide an improved electronic overload relay control system.

A more specific object of the invention is to provide an electronic overload relay control system with an improved level detector comprising a field effect transistor differential amplifier with its attendant advantages.

A field effect transistor draws negligible power from the timing circuit. Its gate leakage current is $10^{19}$ amperes at maximum temperature.

The detection level of the field effect transistor differential amplifier can be set by adjusting a potentiometer.

Being of differential amplifier construction, the detection level is not affected by temperature change if its field effect transistors are relatively well matched. Prior art level detectors that are of the unijunction transistor or bipolar transistor circuit type require microamperes to cause tripping of the circuit which means that the current input to the timing circuit would have to be at least several times this to insure error free tripping action. On the other hand, the level detector of the invention using field effect transistor type of differential amplifier is a much lower current, in the one nanoampere range, and lower power device. The field effect transistor is a voltage controlled device like a vacuum pentode whose input impedance is very high like a piezoelectric device. Due to this high input impedance, any leakage in the gate circuit will be very low. Although it doubles in value for each 10° C. increase in temperature, it still will be very low through the normal operating range.

Due to the low current, low power requirements of the level detector circuit, it is possible to use a relatively small timing capacitor C2 and relatively larger timing resistors R5 and R6 which then permits the use of metallized mylar capacitors that have a very high leakage resistance and a small effect due to temperature change. Prior art timing circuits require the use of relatively large power devices which limits the selection of capacitors to the electrolytic type that have the disadvantages of large leakage currents, electrode forming currents, and a large change of leakage current and capacitance with temperature.

Also due to the low power required to operate the level detector, it has been found possible to charge the timing capacitor to a voltage proportional to the alternating current in the circuit over the entire range of motor currents so that the voltage on this capacitor C2 becomes a function of the temperature of the motor winding. Prior art devices keep the timing capacitor voltage at zero until the maximum continuous current of the system is reached at which time a second level detector operates to allow the timing capacitor to begin to charge and eventually result in trip out of the relay. Therefore, the invention improves the function of the device and also eliminates the need for a second level detector circuit. In the invention, for example, if a motor had been running at 90 percent load and the load was suddenly increased to 150 percent, tripout would occur in a relatively short time compared to trip-out time for a cold motor running on 150 percent load. This gives better protection to the motor than prior art devices that provide the same timing function whether the motor was started cold and ran at 150 percent load or whether it had been running continuously at 90 percent load and then increased to 150 percent load.

The low power input to the level detector circuit also permits the use of a low-power current sensor circuit that reduces the size of current transformers T1, T2 and T3 and reduces the wattage of the current transformer secondary resistors R1, R2 and R3.

The use of quadracs 2, 4 and 6 across the secondaries of the current transformers limits the voltage output of each current transformer to a peak of 40 volts which permits the use of lower voltage secondary insulation on the current transformers and lower voltage semiconductor components D1, D2, D3 and D4. The secondary voltage of the current transformers may reach several hundred volts under fault conditions if these quadracs were not used to limit this voltage.

The use of a diode D4 in parallel with the thermistor eliminates the voltage offset on the timing capacitor as a function of alternating current in the power lines. The result is a voltage on capacitor C1 that is directly proportional to the alternating current right down to zero current. Prior art devices do not take into consideration such offset produced by the voltage drop on the rectifier element or incorporate the offset into the second level detector which is required to start current flow into the timing capacitor.

The trigger circuit of the invention is made relatively insensitive to temperature of semiconductors by the use of a differential amplifier wherein triggering action takes place when the anode of diode D6 goes higher in potential than its cathode causing current flow through resistors R14 and R8 that produces a regenerative action resulting in triggering of the circuit and positive dropout of the overload relay.

The system of the invention prevents reenergization of the overload relay after a trip-out until a time period has elapsed. At the end of this timing period, the reset may be manual or automatic as desired. Prior art devices do not take into consideration the desirability of such time delay.

The invention provides an instantaneous trip current with utmost simplicity and economy. This is an optional feature that can be provided with the addition of a pair of resistors and a transistor Q1. Prior art devices require much more complicated circuits for an instantaneous trip feature.

Other objects and advantages of the invention will hereinafter appear.

DESCRIPTION OF THE PREFERRED EMBODIMENT

Figure 1:
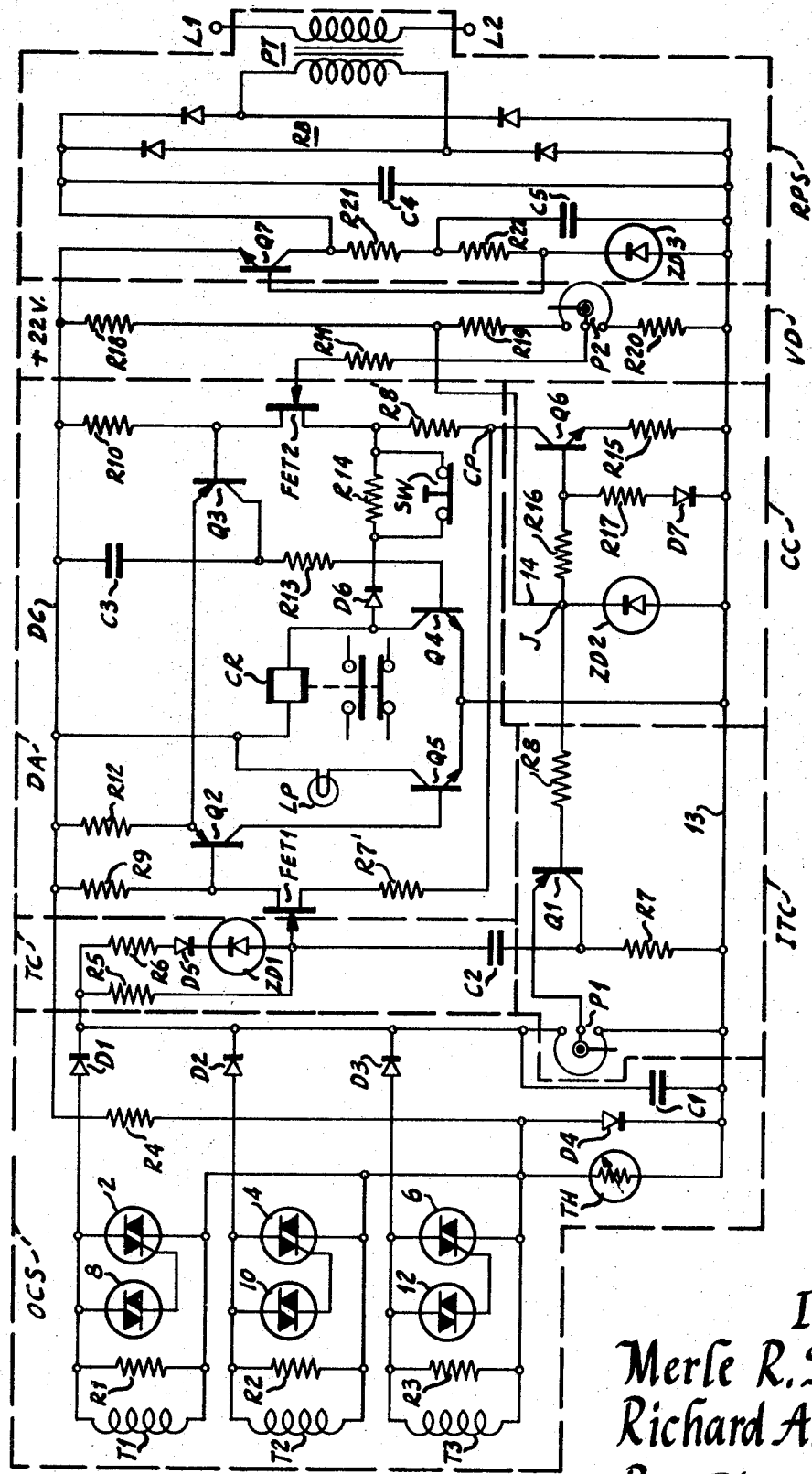
FIG. 1 is a schematic circuit diagram of an electronic motor overload relay control system constructed in accordance with the invention.

Referring to FIG. 1, there is shown a circuit diagram of the overload relay control system. Starting from the left side of this diagram and proceeding toward the right, the component circuits or parts thereof may be identified generally as follows. At the extreme left side is shown an overload current sensing circuit OCS. This connects to a timing circuit TC and an instantaneous trip control circuit ITC, the timing circuit being arranged above the instantaneous trip control circuit. The next part is a differential amplifier DA or rather two differential amplifiers with the second one being within the first one. At the lower portion of the differential amplifier is arranged a constant current circuit CC. To the right of these circuits is arranged a voltage divider VD that supplies current to an ultimate trip amperes adustment potentiometer, supplies reference voltage to the instantaneous trip circuit and controls the constant current circuit. To the right of this voltage divider is a regulated power supply RPS powered from an alternating current power supply source. These component circuits will now be described in more detail in connection with description of operation of the overload relay control system.

The overload sensing circuit OCS at the left portion of FIG. 1 is provided with means for sensing the magnitudes of the currents in the three power lines of a three-phase source supplying a motor. This means comprises three current transformer secondary windings T1, T2 and T3. These current transformer secondaries are each provided with a closed loop core having a toroidally wound conductor thereon and having a central hole or window through which the power line or bus is inserted to serve as the primary of the transformer.

The overload sensing circuit is also provided with means for changing the current signals that are sensed into voltage signals that are required to trip the overload relay. This means comprises secondary current transformer resistors R1, R2 and R3 connected across the respective secondary windings to provide voltages thereacross proportional to the respective primary currents flowing in the power buses.

The overload sensing circuit is also provided with means for protecting the components in the following circuits from excessive voltages such as transient voltage peaks and the like. This means comprises three gate controlled AC switches 2, 4 and 6 connected across the respective secondary windings of the current transformers. These gate controlled AC switches are preferably bidirectional triode thyristors such as triacs, quadracs, or the like. To control firing of these quadracs, three bidirectional diode thyristors 8, 10 and 12 such as diacs or the like are provided. Each such diac is connected between the gate of the respective quadrac and one side of the respective secondary winding. These diacs are arranged to break over at 40 volts or the like to pass current and to fire the respective quadracs. When one of these quadracs is rendered conducting, it in effect short circuits the secondary winding of the associated current transformer. As can be seen, this limits the voltage of any resistor R1, R2, or R3 to 40 volts and shunts current form such resistor if its voltage goes above that valve.

The overload sensing circuit is also provided with rectifying means for rectifying the alternating voltages that appear across resistors R1, R2 and R3 to provide a direct voltage proportional to the currents in the three buses. This means comprises three undirectional conducting diodes D1, D2 and D3 connected between one side of the respective current transformer secondary resistors R1, R2 and R3 and a charge storage capacitor C1. In this manner, this capacitor is charged to a voltage in accordance with the highest voltage signal on any of the current transformer secondary resistors. The other side of this capacitor is connected to a common conductor 13. The other side of this capacitor is also connected to the other sides of resistors R1, R2 and R3 through a compensating diode D4 whose function will hereinafter be described.

Diode D4 is provided in order to compensate for the unwanted voltage drop in diodes D1, D2 and D3. And thermistor TH is connected across diode D4 to make its temperature variation similar to that of diodes D1, D2 and D3. The rectifying diodes D1, D2 and D3 are silicon diodes that have a voltage drop of about 0.5 volt at the small current flow therethrough when capacitor C4 is nearly fully charged. This voltage drop is undesirable because it makes the voltage that will be used for tripping control a half of a volt lower than the actual overload signal voltage. Since a germanium diode has a half-volt drop at a higher current, such germanium diode D4 is placed in the return path between the other side of capacitor C1 and the current transformer secondaries. To provide the higher current to this diode D4, direct current supply conductor DC is connected through a resistor R4 to the anode of this diode D4 while its cathode is connected to common conductor 13. In order to put this germanium diode D4 in the return path of the charging circuit of capacitor C1, the other sides of the current transformer secondaries are connected to the anode thereof. In this manner, current continuously flows from supply conductor DC through resistor R4 and diode D4 to common conductor 13 to provide the half-volt drop on this diode and to keep it open so that capacitor C1 charging current can flow in the reverse direction therethrough. As a result, diode D4 shifts the signal voltage back up the same amount that it is shifted down by diodes D1, D2 and D3 so that the voltage on capacitor C1 will be accurately proportional to the highest overload current in any of the three buses.

Thermistor TH compensates for the difference in temperature characteristic of diode D4 relative to diodes D1, D2 and D3. The voltage on this germanium diode D4 changes less with change in temperature than does the voltage on diodes D1, D2 and D3. To compensate for this, thermistor TH is connected across diode D4 to bring the variation with temperature across this combination closely similar to what occurs on the silicon diodes D1, D2 and D3.

From the foregoing, it will be apparent that the voltage on capacitor C1 follows the highest of the three voltages on the three legs of the overload sensing circuit. This voltage on capacitor C1 then controls time delay tripping of overload relay CR or instantaneous tripping thereof as hereinafter more fully described.

The timing circuit TC that controls delayed tripping comprises an RC circuit having a resistor R5 and a capacitor C2. The voltage at the upper side of capacitor C1 is connected through this resistor R5 to capacitor C2. Consequently, capacitor C2 will be charged by the voltage on capacitor C1 at a rate dependent on the value of resistor R5.

Figure 2:
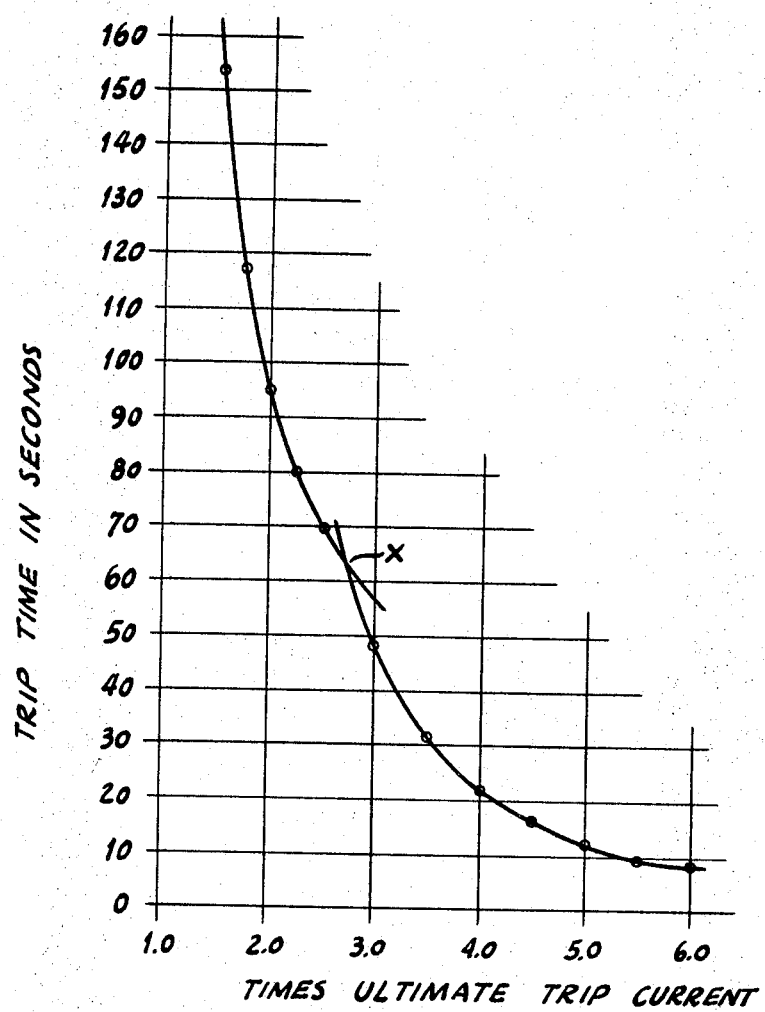
FIG. 2 is a graphic illustration of the tripping time-overcurrent characteristic of the system of FIG. 1.

The timing circuit also comprises means for changing its timing function when the voltage on capacitor C1 exceeds a predetermined value. This means comprises a resistor R6 and a Zener diode ZD1 connected in series with one another and the pair being connected in parallel with resistor R5. When the voltage on capacitor C1 exceeds the breakover value of Zener diode ZD1, it breaks over and allows current to flow through it and resistor R6 to charge capacitor C2. This increases the charging rate since two currents now flow to capacitor C2, one through resistor R5 and the other through resistor R6 and Zener diode ZD1. As a result, the time delay is reduced at higher overload currents to match the motor characteristics as hereinafter more fully described in connection with the curve in FIG. 2. The voltage of capacitor C2 is applied from the upper side thereof, that is, from the junction between it and resistor R5 and Zener diode ZD1, to the tripping circuit that is a differential amplifier DA as hereinafter described.

A unidirectional diode D5 may be connected in series with resistor R6 and diode ZD1 for blocking capacitor C2 discharge current from flowing through resistor R6 to provide time delayed resetting as hereinafter described.

The instantaneous trip control circuit is provided with means operable when the voltage on capacitor C1 exceeds a predetermined value for causing immediate deenergization of the overload relay without any time delay. This means comprises a potentiometer P1, a transistor Q1 of the PNP conductivity type or the like, and resistors R7 and R8. Zener diode ZD2 may also be considered a part of the instantaneous trip control circuit although it is used in common to serve two other purposes in addition to its use therein.

In this circuit, the resistor of potentiometer P1 is connected across capacitor C1, and its movable slider is connected to the emitter of transistor Q1. Resistor R7 is connected between capacitor C2 of the timing circuit and common conductor 13. The collector of transistor Q1 is connected through resistor R7 to common conductor 13 and the base thereof is connected through resistor R8 and Zener diode ZD2 to common conductor 13. The junction J between resistor R8 and Zener diode ZD2 receives a voltage that is held constant by the Zener diode as hereinafter described.

From the foregoing, it will be apparent that when the voltage at the movable tap of potentiometer P1 exceeds the reference voltage on Zener diode ZD2 plus the forward biased emitter-base voltage of Q1, current flows to turn transistor Q1 on. This current flows through the emitter-base circuit of transistor Q1 and resistor R8. As a result of such turn on, current flows through the emitter-collector circuit of this transistor and through resistor R7 to common conductor 13. This current flow causes a corresponding voltage rise at the upper end of resistor R7. Since capacitor C2 cannot charge or discharge instantly, the voltage at its upper side increases similarly and is applied to the differential amplifier for instantaneous tripping thereof.

Differential amplifier DA comprises a pair of junction type field effect transistors FET1 and FET2 arranged so that one of them will be conducting more than the other one. For this purpose, the source electrodes thereof are connected through respective resistors R7 and R8 to a common point CP that is connected to constant current circuit CC as hereinafter described. The drain electrodes thereof are connected through respective resistors R9 and R10 to positive conductor DC. The gate of field effect transistor FET1 is connected to receive a signal from the aforesaid timing circuit at the upper side of capacitor C2. The gate of field effect transistor FET2 is connected through a resistor R11 to the movable tap of an ultimate trip amperes potentiometer P2.

Differential amplifier DA also comprises a pair of transistors Q2 and Q3 of the PNP conductivity type or the like controlled by the respective field effect transistors. To this end, positive conductor DC is connected through a resistor R12 to the emitters of both of these transistors. The base electrodes thereof are connected to the drain electrodes of field effect transistors FET1 and FET2, respectively.

The collector of transistor Q3 is connected through a resistor R13 to the base of an NPN conductivity type transistor Q4 for controlling an overload relay CR. To this end, positive conductor DC is connected through the operating coil of relay CR to the collector of transistor Q4 while the emitter thereof is connected to common conductor 13. A capacitor C3 is connected between the collector of transistor Q3 and positive conductor DC for purposes hereinafter described. The collector of transistor Q4 is connected through a unidirectional diode D6 and a resistor R14 to the junction between the source electrode of field effect transistor FET2 and resistor R8. A manual reset control switch SW of the pushbutton type having a normally closed contact is connected across resistor R14.

The collector of transistor Q2 controls an indicator lamp circuit. To this end, this collector is connected to the base of an NPN conductivity type transistor Q5. The emitter of transistor Q5 is connected to common conductor 13 whereas the collector thereof is connected through an indicator lamp LP to positive conductor DC.

Overload relay CR is provided with contacts of the normally open and normally closed type shown as desired for controlling connection and disconnection of power through the three-phase lines whose currents are being sensed by transformer secondary windings T1, T2 and T3.

The constant current circuit CC at the lower part of the differential amplifier comprises an NPN conductivity transistor Q6 having its collector connected to common point CP and its emitter connected through a resistor R15 to common conductor 13. This constant current circuit supplies current to the differential amplifier hereinbefore described. The base of transistor Q6 is connected through a resistor R16 to the junction J between resistor R8 and Zener diode ZD2. The base of this transistor is also connected through a resistor R17 and a unidirectional diode D7 to the common conductor. This junction J is connected through a conductor 14 to the voltage divider hereinafter described.

Voltage divider VD comprises a pair of resistors R18 and R19 connected in series from positive conductor DC to the upper side of potentiometer P2, the lower side of this potentiometer being connected through a resistor R20 to common conductor 13. The junction between resistors R18 and R19 is connected through conductor 14 and Zener diode ZD2 to common conductor 13. The movable tap of potentiometer P2 is connected to the differential amplifier for setting the ultimate trip current value.

Regulated power supply RPS comprises a power transformer PT having its primary winding connected to power supply lines L1 and L2 and having its secondary winding connected to the input terminals of a rectifier bridge RB. The positive output terminal of the rectifier bridge is connected through the collector and emitter circuit of an NPN conductivity-type power transistor Q7 to positive conductor DC. The negative output terminal of the rectifier bridge is connected to common conductor 13. A filter capacitor C4 is connected across the output terminals of the rectifier bridge. A base control circuit for transistor Q7 comprises resistors R21 and R22 and a Zener diode ZD3 connected in series in that order from the positive output terminal of the rectifier bridge to the negative output terminal thereof. The junction between resistor R22 and Zener diode ZD3 is connected to the base of transistor Q7. A filter capacitor C5 is connected across resistor R22 and Zener diode ZD3.

DESCRIPTION OF OPERATION

The operation may be generally described as follows. Overload relay CR is normally energized and becomes deenergized when an overload current is sensed. For energization of relay CR, transistors Q3, Q4 and FET2 normally conduct. Transistor Q7 conducts at all times to supply regulated voltage to positive conductor DC. Transistor Q6 conducts at all times to supply constant current to the differential amplifier. Alternating voltages proportional to the transformer primary currents appear across resistors R1, R2 and R3 that are in series with the CR secondary windings of the current transformers. These voltages are rectified by diodes D1, D2 and D3 to produce a voltage on capacitor C1 that is proportional to the peak value of the highest AC voltage appearing on the three resistors. For an inverse time-current trip function, the voltage on capacitor C1 is transferred to capacitor C2, providing an inverse time-current characteristic determined by the time constant of the resistor R5 and capacitor C2 combination. Transistor FET1 of the differential amplifier senses the voltage on capacitor C2. If this voltage exceeds a nominal value of 2 volts, relay CR will be deenergized. An instantaneous trip feature is included for operation in the event the overload current exceeds the ultimate (timed) trip current by a predetermined amount. In such case, the voltage on the slider of potentiometer P1 will exceed the reference value of Zener diode ZD2 plus emitter-base voltage of Q1 causing transistor Q1 to conduct whereby current flows through resistor R7. Since capacitor C2 cannot change its charge instantly, the gate of transistor FET1 will be driven higher in voltage to cause deenergization of relay CR.

A more detailed description of operation of the several parts of the electronic overload system will now be given.

REGULATED POWER SUPPLY OPERATION

When alternating current power is connected to lines L1 and L2 to energize the primary winding of transformer PT, current flows from the opposite ends of the secondary winding thereof on alternate half-cycles. This current is rectified in bridge RB to provide unidirectional current to charge filter capacitor C4. This capacitor charges with positive polarity on top and negative polarity at the bottom thereof to smooth the output voltage of the bridge.

This smoothed voltage is applied to the collector of transistor Q7 and also across resistors R21 and R22 and Zener diode ZD3 in series. The voltage at Zener diode ZD3 is held at a reduced ripple value due to the filtering action provided by capacitor C5 and resistors R21 and R22.

Zener diode ZD3 provides a substantially constant voltage at its junction with resistor R22. This constant voltage is applied therefrom to the base of power transistor Q7 to turn it on. As a result, current flows through the collector and emitter of this power transistor to conductor DC to provide on this conductor a positive voltage of 22 volts DC or the like relative to common conductor 13.

This voltage on positive conductor DC provides supply voltage to voltage divider circuit VD, differential amplifier DA and to the compensating circuit comprising resistor R4 and diode D4 in overload current sensing circuit OCS as hereinafter described.

VOLTAGE DIVIDER OPERATION

Current flows from positive conductor DC through resistors R18 and R19, the resistor of potentiometer P2 and resistor R20 to common conductor 13. The voltage at the junction of resistors R18 and R19 causes current flow through conductor 14 and Zener diode ZD2 to common conductor 13.

This Zener diode ZD2 regulates the voltage for three purposes, namely, maintains the voltage divider voltage constant, maintains a constant input control to the constant current circuit and maintains a constant reference voltage for the instantaneous trip circuit.

This regulation of the voltage divider voltage maintains a constant but adjustable voltage at the slider of potentiometer P2.

This voltage is applied to the differential amplifier for purposes hereinafter described.

DIFFERENTIAL AMPLIFIER TURN-ON

A voltage is applied from the slider of potentiometer P2 through resistor R11 to the gate of field effect transistor FET2. To preadjust the circuit, a standard reference voltage of 2 volts is connected to the gate of field effect transistor FET1 and the slider of ultimate trip amps potentiometer P2 is adjusted so that the circuit is on the verge of tripping. This setting of the potentiometer is then marked 1.0. This process may then be repeated for standard reference voltages of 2.4, 2.2, 1.8, and 1.6 volts and the respective settings of the potentiometer marked 1.2, 1.1, 0.9, and 0.8. The standard reference voltage is then removed so that the system is ready to sense overload currents.

This voltage at the gate of field effect transistor FET2 will cause it to conduct. Consequently, current flows from conductor DC through resistor R10, the drain and source electrodes of transistor FET2, resistor 8 and then through the constant current circuit including the collector and emitter of transistor Q6 and resistor R15 to common conductor 13.

This constant current circuit which may be considered a part of the differential amplifier supplies a constant current to the differential acting portion of the amplifier. To this end, the voltage applied from voltage divider VD to junction J and regulated by Zener diode ZD2 controls the constant current circuit. This constant voltage at junction J causes a constant current to flow through resistor R16, the base and emitter of transistor Q6 and resistor R15 to common conductor 13. As a result, transistor Q6 will be turned on to allow a current of constant value to flow in its collector-emitter circuit. Resistor R17 and diode D7 form with resistor R16 a voltage divider to put the proper value of voltage on the base of transistor Q6.

Under these conditions when the drain voltage of field effect transistor FET2 is lower than the drain voltage of field effect transistor FET1, as it is when the former is conducting, transistor Q3 will conduct. This conduction of transistor Q3 is caused by current flow from conductor DC through resistor R12 and the emitter-base circuit thereof to the drain electrode of transistor FET2. As a result, current will flow through the emitter-collector circuit of transistor Q3, resistor R13 and the base-emitter circuit of transistor Q4 to render the latter conducting. This causes energization of the overload relay CR by current flow from conductor DC through the coil thereof and the collector-emitter circuit of transistor Q4 to common conductor 13. Relay CR operates its contacts to close the power circuit to the load such as a motor whose overload condition will be monitored.

Capacitor C3 has a threefold purpose. It prevents rapid change of transistor Q4 base current so that transient voltages that may creep into the electronic circuitry will not cause erroneous trip out of relay CR. Secondly, it prevents rapid changes of base current in transistor Q4 and consequent rapid changes of voltage or current through the coil of relay CR which then prevents large di/dt voltages being induced in its coil which become transistor Q4 collector voltages that might cause avalanching and possible secondary breakdown. And thirdly, it insures current flow through the base of transistor Q4 upon turn-on of the circuit so that relay CR will be energized.

The system is now in condition for sensing overload conditions.

OVERLOAD SENSING

When an overload condition occurs in one or more of the three-phase lines connecting power to the motor and about which lines secondary windings T1, T2 and T3 are placed, a voltage proportional to such primary current in the line is induced in the secondary winding and applied across the secondary resistor R1, R2 or R3. This voltage causes current to flow that is rectified in diodes D1, D2 and D3 and applied to charge capacitor C1. The return path for this current extends through diode D4. This return path is effective because diode D4 is always held conducting in the forward direction by current flow from positive conductor DC through resistor R4 and diode D4 to common conductor 13.

While three transformer secondaries have been shown for monitoring a three-phase line, it is apparent that more or less could be used since capacitor C1 changes in accordance with the highest voltage on resistors R1, R2 and R3.

TIMING CIRCUIT OPERATION

The charge on capacitor C1 is applied to the timing circuit that interposes a time delay between the time that the overload condition occurs and the time that the differential amplifier trips relay CR. To this end, the charge on capacitor C1 causes current to flow therefrom through resistor R5 to capacitor C2. The RC time constant of resistor R5 and capacitor C2 provides a trip time characteristic as shown by the upper portion of the curve in FIG. 2 for various values of trip current. In this graph, the trip time is plotted against multiples of ultimate trip current.

Resistor R6 in series with Zener diode ZD1 is used to modify the time current relationship as desired. Up to the value of overload current that produces a voltage (on capacitor C1) below the breakdown voltage of the Zener diode, this parallel branch including resistor R6 and Zener diode ZD1 will not conduct current and will have no effect on the timing. But when the overload current exceeds a value that will produce a voltage that exceeds the breakdown voltage of the Zener diode, at point X on the curve, resistor R6 will begin to conduct current. Current will then flow through both resistors R5 and R6 to change the timing characteristic as shown by the lower portion of the curve in FIG. 2. It will be seen that at these high values of current, the trip time is reduced. The system has an inverse tripping current-time characteristic in that the higher the overload current, the shorter will be the tripping time.

DIFFERENTIAL AMPLIFIER TRIPPING OPERATION

As hereinbefore described in connection with turn-on of the differential amplifier, the drain voltage of field effect transistor FET2 is lower than the drain voltage of field effect transistor FET1 and relay CR is energized.

When an overload current condition occurs, transistor FET1 current increases and transistor FET2 current decreases to deenergize relay CR. To this end, the current flowing into timing capacitor C2 causes the voltage at its upper side to increase. As the voltage on capacitor C2 approaches a nominal value of 2 volts, this voltage being applied to the gate of transistor FET1, the drain voltage of transistor FET1 will decrease. This comes about by the increasing current flow through the drain and source electrodes causing a larger voltage drop in drain resistor R9. This decrease will cause it to approach the drain voltage of transistor FET2. When it becomes less than the drain voltage of transistor FET2, transistor Q2 is rendered conducting and transistor Q3 is rendered nonconducting. As a result, transistor Q4 is also rendered nonconducting to deenergize relay CR.

Conduction of transistor Q2 causes current to flow from conductor DC through resistor R12, the emitter and collector thereof and then through the base and emitter of transistor Q5 to turn the latter on. This causes lamp LP to be lit as an indication that relay CR has tripped.

MANUAL OR AUTOMATIC RESET

After the system has tripped to deenergize relay CR, it is desirable to reset the system after the overload condition has terminated so that it can again monitor overload currents.

Manual reset is provided by switch SW and automatic reset is provided by diode D6 and resistor R14 if switch SW is omitted.

When the circuit tripped and transistor Q4 was rendered nonconducting, the current in the coil of relay CR decreases. As this current decreases, the latchout circuit comprising diode D6 and resistor R14 comes into effect. As the anode of diode D6 goes positive with respect to the cathode, current flows through diode D6, switch SW and resistor R8 to constant current circuit CC. This current increases the voltage drop on resistor R8 thereby to increase the drain voltage on transistor FET2. This locks out the circuit by maintaining transistor Q3 nonconducting which maintains transistor Q4 nonconducting. Thus, no condition of voltage on the gate of transistor FET1 will cause the circuit to trip back in until the reset switch SW is depressed.

When the reset switch is depressed to remove the shunt from resistor R14, there is still a lockout effect due to the current in resistor R14 but it is diminished. There is a certain voltage between 2 volts and zero on the gate of transistor FET1. The result of this is that the drain voltage of transistor FET2 is lower than the drain voltage of transistor FET1 which will cause the circuit to trip back in. As a result, relay CR reenergizes.

When the differential amplifier trips out at about 2 volts, there will be a time delay required for capacitor C2 to discharge through resistor R5, following termination of the overload condition, to the aforesaid new value that permits resetting. Thus it will be seen that if a switch SW is connected in the circuit as shown, manual resetting control is provided. If switch SW is disconnected, automatic resetting is provided. For such automatic resetting, the operation is the same as that described above following depression of switch SW.

INSTANTANEOUS TRIP

This is an optional feature that may be used in combination with the time delay tripping hereinbefore described if desired. It may be readily omitted from the system if this feature is not needed.

This feature affords immediate tripping on larger overloads without the above described time delay.

For this purpose, let it be assumed that the voltage divider and Zener diode ZD2 maintain a reference voltage of 3.6 volts conductor junction J. The voltage appearing on capacitor C1 is applied across the resistor of potentiometer P1. The slider of potentiometer P1 taps off a portion of the voltage appearing thereacross. On a large overload current, when the voltage on the slider of potentiometer P2 becomes greater then the 3.6 volts reference voltage provided by Zener diode ZD2, the emitter-base junction of transistor Q1 will be forward biased to render it conducting. This transistor will be turned on by current flow from the tap of potentiometer P1 through its emitter-base junction, resistor R8, junction J, Zener diode ZD2 and common conductor 13 to the lower end of the resistor of the potentiometer. As a result, the voltage appearing across the lower portion of the potentiometer will also cause current to flow from the tap thereof through the emitter-collector junction of transistor Q1 and resistor R7.

This current in resistor R7 will raise the voltage suddenly at the upper end thereof. Since capacitor C2 cannot change its charge instantly, the gate of field effect transistor FET1 will be driven 3.6 volts or more positive depending upon the magnitude of the overload current. This will be sufficient to cause transistor FET1 to trip out relay CR regardless of the voltage initially appearing on capacitor C2.

An exemplary setting of potentiometer P1 may be as follows.

With ultimate trip amps potentiometer P2 at a setting of 1.0, the overload relay will trip out at 2 volts. This 2 volts is proportional to 100 percent current in the motor supply lines. At 300 percent current, 6 volts is produced. Therefore, potentiometer P1 may be adjusted so that transistor Q1 will conduct when the voltage on capacitor C1 rises to 6 volts. Intermediate values may be calibrated in this manner and marked on the potentiometer P1 dial plate.

If the ultimate trip amps potentiometer P2 is set to some value other than 1.0, this means that the trip out voltage level will be something other than 2 volts. In order to bring it back to 2 volts, instantaneous trip potentiometer P2 will have to be readjusted.

If the system is arranged for manual reset as hereinbefore described, it will be necessary to push the reset switch button to restore operation following instantaneous trip.

If the system is arranged for automatic reset as hereinbefore described, relay CR will reenergize upon cessation of the overload current condition unless the voltage on capacitor C2 is close to the trip out value for ultimate trip in which case a time period will elapse before the relay will reset as hereinbefore described.

As will be apparent, the instantaneous trip is an optional feature. It can readily be omitted by disconnecting the slider of potentiometer P1, transistor Q1 and resistor R8, and connecting capacitor C2 directly to common conductor 13.

This overload relay circuit has an inherent fail-safe feature. Since the relay is normally energized and becomes deenergized on detection of an overload, the relay will also become deenergized to interrupt the circuit on power failure as a fail-safe feature.

We claim:

1. In an electronic overload relay control system for monitoring the current in one or more power lines supplying a load device, the combination comprising:

an overload current sensing circuit for sensing the current in one or more power lines and for providing a signal proportional thereto;

an inverse time-overcurrent circuit responsive to said signal for providing a time delayed trip voltage;

a differential amplifier including a circuit for supplying constant current for operation thereof;

a power supply source for supplying unidirectional supply voltage to said differential amplifier and said constant current circuit;

a voltage divider supplied from said source for applying an input control signal to said constant current circuit and an operating control signal to said differential amplifier to render it operative;

an overload relay responsive to said operative condition of said differential amplifier for energizing said relay and operating its contacts to complete the power line connection;

and said differential amplifier being responsive to said time delayed trip signal exceeding a predetermined ultimate trip value indicative of a sustained overload condition for tripping said relay into its restored condition, causing it to restore its contacts and interrupt the power line connection.

2. The invention defined in claim 1, wherein said differential amplifier comprises:
a pair of field effect transistors one of which is controlled by said operating control signal coming from said voltage divider to cause energization of said overload relay and the other of which is controlled by said time delayed trip signal when it exceeds said predetermined value to cause deenergization of said overload relay.

3. The invention defined in claim 2, wherein said differential amplifier also comprises:
a pair of bipolar transistors one of which is controlled by said one field effect transistor and the other of which is controlled by said other field effect transistor;
and a third bipolar transistor controlled by said one bipolar transistor for energizing said overload relay.

4. The invention defined in claim 3, wherein said differential amplifier also comprises:
a lockout circuit operable when said third bipolar transistor starts to turn off for shifting the supply voltage on said one field effect transistor in a direction causing further turn-off of said one bipolar transistor thereby producing a regenerative action that causes positive deenergization of said overload relay.

5. The invention defined in claim 4 wherein said lockout circuit comprises:
a unidirectional diode and a resistor connected in series from the output of said third bipolar transistor to the source electrode of said one field effect transistor;
and said differential amplifier further comprising a source resistor connecting said source electrode to said constant current circuit whereby current flow through said lockout circuit increases the voltage drop on said source resistor to cause said regenerative action.

6. The invention defined in claim 5, together with:
a normally closed manual reset switch connected across the resistor of said lockout circuit operable when closed to prevent resetting and operable when opened to cause resetting with reenergization of said overload relay.

7. The invention defined in claim 1, wherein aid overload current sensing circuit comprises:
a current transformer for each power line that is being monitored;
each said current transformer having a toroidal secondary winding through which the associated power line passes;
a resistor across each said secondary winding for providing a voltage proportional to the current in the associated power line;
a storage capacitor;
and a circuit comprising a rectifier for each secondary winding connecting all the secondary windings to said capacitor to provide thereon a direct voltage proportional to the highest peak current on the power lines.

8. The invention defined in claim 7, wherein said overload current sensing circuit also comprises;
a solid-state device in the return path from said storage capacitor back to said secondary windings to compensate for the voltage offset caused by said rectifiers.

9. The invention defined in claim 7, wherein said overload current sensing circuit also comprises:
a unidirectional conducting device for compensating for the voltage offset caused by said rectifiers;
a resistive circuit connected to said power supply source for causing current flow through said unidirectional conducting device in its forward low impedance direction;
and means connecting said unidirectional conducting device in its reverse high impedance direction in the return path from said storage capacitor back to said secondary windings.

10. The invention defined in claim 8, wherein said overload current sensing circuit further comprises:
a thermistor connected across said unidirectional conducting device to compensate for the difference in thermal coefficients between said rectifiers which are silicon devices and said unidirectional conducting device which is a germanium device.

11. The invention defined in claim 1, together with:
instantaneous trip means responsive when said signal provided by said overload current sensing means exceeds a given value higher than said predetermined value for producing an instantaneous increase in said trip signal to said differential amplifier thereby to cause tripping of said overload relay without any time delay.

12. The invention defined in claim 1, wherein said overload current sensing circuit comprises:
a current transformer having a secondary winding coupled to each power line that is being monitored;
a storage capacitor;
means comprising a rectifier for each said secondary winding for charging said storage capacitor to a direct voltage proportional to the highest peak current of any of the power lines, said direct voltage being applied to said inverse time-overcurrent circuit;
together with an instantaneous trip circuit comprising;
a transistor;
means for applying a reference voltage from said voltage divider to said transistor to maintain it nonconductive;
means responsive to the voltage on said storage capacitor exceeding a value proportional to said reference voltage for rendering said transistor conducting;
and means responsive to conduction of said transistor for causing an instantaneous increase in the trip signal to said differential amplifier thereby to cause tripout of said overload relay without any time delay.

13. The invention defined in claim 12, wherein said means responsive to the voltage on said storage capacitor exceeding a value proportional to said reference voltage for rendering said transistor conductive comprises:
a potentiometer connected across said storage capacitor for selecting a portion of the voltage thereof for application to said transistor for instantaneous trip purposes.

14. The invention defined in claim 12, wherein said voltage divider comprises:
a Zener diode for providing a constant voltage for three purposes, one of which is to apply a constant input signal to said constant current circuit, another of which is to maintain the operating control signal that goes to the differential amplifier constant, and the third of which is to maintain constant the reference voltage going to the transistor of the instantaneous trip circuit.

15. The invention defined in claim 1, wherein said inverse time-overcurrent circuit and said differential amplifier comprise:
automatic time delay resetting means operable following termination of the overload condition for causing reenergization of said overload relay after a predetermined time delay.

16. The invention defined in claim 1, wherein said voltage divider comprises:
means for adjusting the value of the operating control signal applied to said differential amplifier thereby to adjust the ultimate trip valve of the overload current.

17. The invention defined in claim 1, wherein said load is a motor and said inverse time-overcurrent circuit comprises:
an RC circuit that responds to said overload current sensing circuit signal for providing an inverse current-time function;
and including means operable when said signal reaches a high value for modifying said inverse current-time function to match the motor characteristics.